(12) United States Patent
Decrop et al.

(10) Patent No.: US 11,762,456 B2
(45) Date of Patent: Sep. 19, 2023

(54) HEAD-MOVEMENT-BASED USER INTERFACE AND CONTROL

(71) Applicant: International Business Machines Corporation, Armonk, NY (US)

(72) Inventors: Clement Decrop, Arlington, VA (US); Martin G. Keen, Cary, NC (US); John M. Ganci, Jr., Raleigh, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 17/485,708

(22) Filed: Sep. 27, 2021

(65) Prior Publication Data
US 2023/0100411 A1 Mar. 30, 2023

(51) Int. Cl.
*G06F 3/01* (2006.01)
*G06N 20/00* (2019.01)
*G06N 5/022* (2023.01)

(52) U.S. Cl.
CPC ............. *G06F 3/012* (2013.01); *G06N 5/022* (2013.01); *G06N 20/00* (2019.01)

(58) Field of Classification Search
None
See application file for complete search history.

(56) References Cited

U.S. PATENT DOCUMENTS

| 8,655,004 | B2 | 2/2014 | Prest et al. |
| 9,237,393 | B2 | 1/2016 | Abrahamson et al. |
| 10,559,145 | B1 | 2/2020 | Almehmadi |
| 2012/0002822 | A1 | 1/2012 | Peissig et al. |
| 2012/0064951 | A1 | 3/2012 | Agevik et al. |
| 2015/0003651 | A1 | 1/2015 | Han et al. |
| 2015/0169821 | A1* | 6/2015 | Peters ................. G06Q 10/101 703/1 |
| 2017/0017807 | A1 | 1/2017 | Cohen |
| 2021/0021888 | A1 | 1/2021 | Han et al. |
| 2022/0191638 | A1* | 6/2022 | Stengel ................. G06V 40/10 |
| 2022/0269349 | A1* | 8/2022 | Nagar ..................... G06F 3/013 |

FOREIGN PATENT DOCUMENTS

| CN | 105933547 A | 9/2016 |
| CN | 106255970 A | 12/2016 |
| CN | 108540669 A | 9/2018 |
| JP | 6422137 B2 | 11/2018 |

(Continued)

OTHER PUBLICATIONS

Min et al., "Exploring Audio and Kinetic Sensing on Earable Devices," ACM, WearSys'18, Jun. 10, 2018, Munich, Germany, 6 pages.

(Continued)

*Primary Examiner* — Nicholas J Lee
(74) *Attorney, Agent, or Firm* — Mark Bergner

(57) ABSTRACT

Head movements can be detected by various sensors. The head movements are tracked over time, and the data is stored in a knowledgebase. User actions are also detected and tracked in the knowledgebase. Therefore, associations between head movements and user actions can be learned and predicted. Upon detecting a head movement associated with a user action, the user action can be executed.

20 Claims, 5 Drawing Sheets

(56) References Cited

FOREIGN PATENT DOCUMENTS

WO     2015127154  A1     8/2015
WO     2023045578  A1     3/2023

OTHER PUBLICATIONS

Ferlini et al., "Head Motion Tracking Through in-EarWearables," EarComp'19, Sep. 9, 2019, London, United Kingdom, 6 pages.
"Mobile experiences for everyone," IBM, Printed Sep. 14, 2021, 3 pages, https://www.ibm.com/services/ibmix/mobile/.
"Build smarter mobile services and apps," IBM, Printed Sep. 14, 2021, 6 pages, https://www.ibm.com/mobile.
"IBM Watson products," IBM, Printed Sep. 14, 2021, 13 pages, https://www.ibm.com/watson/products-services.
Mahto et al., "Ear Acoustic Biometrics Using Inaudible Signals and Its Application to Continuous User Authentication," IEEE, 2018 26th European Signal Processing Conference (EUSIPCO), Sep. 3-7, 2018, 5 pages, https://ieeexplore.ieee.org/document/8553015.
Carnoy, "Apple's new AirPods Pro spatial audio feature is here, and it lives up to the hype," CNET, Oct. 2, 2020, 12 pages, https://www.cnet.com/news/apple-new-airpods-pro-spatial-audio-feature-is-here-it-lives-up-to-the-hype/.
International Search Report and Written Opinion, International Application No. PCT/CN2022/110003, dated Oct. 26, 2022, 9 pgs.

\* cited by examiner

HEAD-MOVEMENT-BASED USER INTERFACE AND CONTROL

BACKGROUND

The systems and methods of the present disclosure relate to Internet of Things (IoT) and wearable devices.

IoT devices generally refers to various devices that can communicate with one another on a network, such as a "smart home" network (e.g., a thermostat communicating with a laptop computer).

Machine learning generally refers to computer systems capable of evolving ("learning") over time. In particular, machine learning systems can "discover" ways to perform designated tasks without having been explicitly programmed to perform them. For example, a machine learning system may be configured to identify objects in an image. In order to accomplish this, the system may make guesses as to the objects in the image, compare those guesses to known answers, and adjust itself based on discrepancies between its guesses and the known answers. The system may repeat this process repeatedly (known as "training"), over time refining its process until it is accurate enough to reliably identify objects.

SUMMARY

Some embodiments of the present disclosure can be illustrated as a method. The method includes receiving sensor data from a sensor, the sensor affixed to a head of a user. The method also includes detecting, based on the sensor data, a head movement performed by the user. The method also includes comparing the head movement with a knowledgebase. The method also includes predicting, based on the comparing, an action by the user. The method also includes executing the predicted action.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
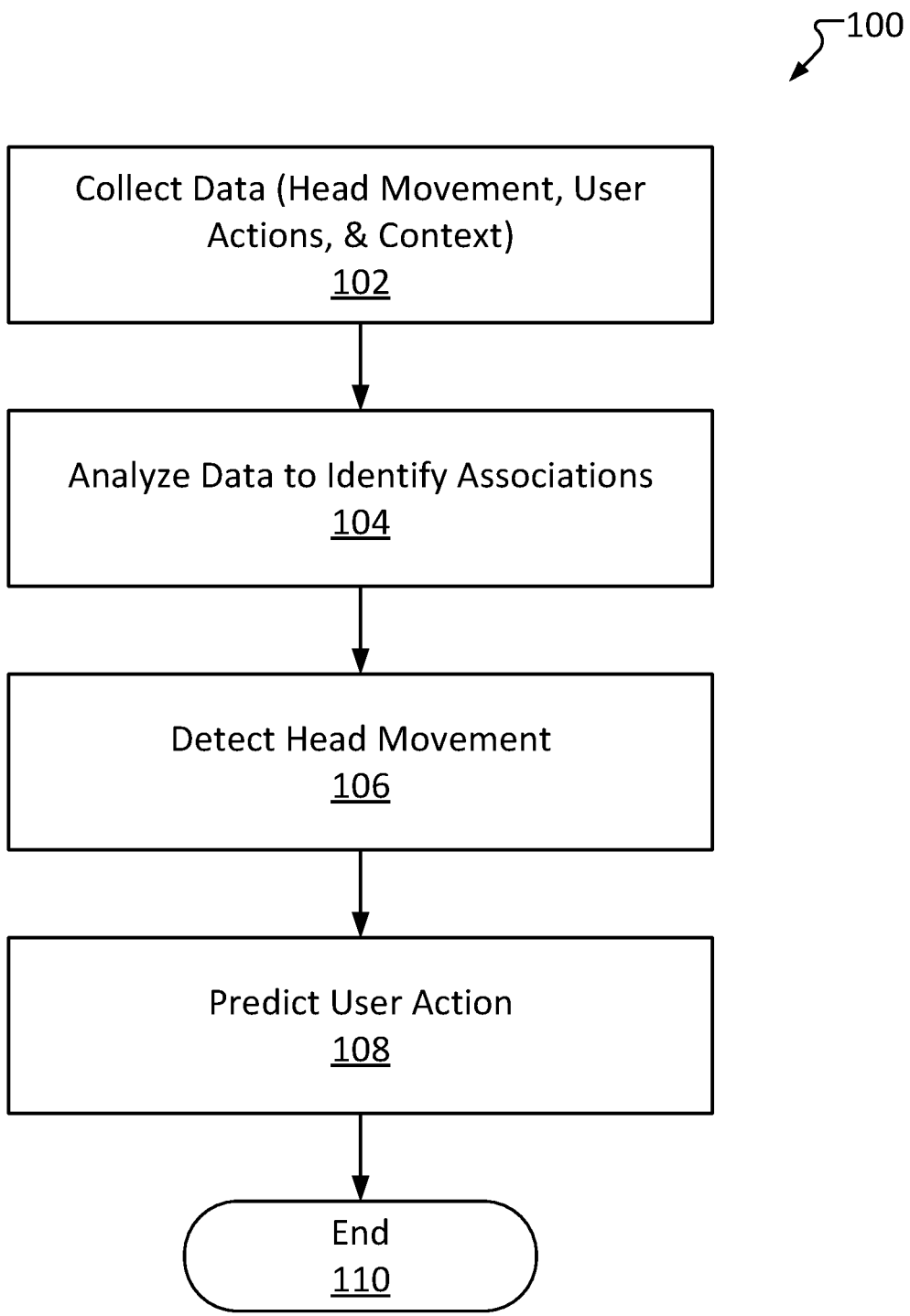
FIG. 1 is a high-level method of user action prediction learning, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to leverage head movement data for user inputs. More particular aspects relate to detecting a head movement, predicting an action of a user based on the head movement, executing the predicted action, and receiving user feedback related to the executed action.

User devices such as headphones, mobile devices, computers, etc., are increasingly interconnected, often providing added convenience and increased accessibility. Further, many devices have several different sensors, utilized for various purposes. Systems and methods consistent with the present disclosure enable utilizing the data collected from these sensors for user inputs.

For example, some modern "earbud"-style headphones ("earbuds") include accelerometers and gyroscopes, which are utilized to detect when a user inserts the earbuds into the user's ear (or removes them from the ear). However, many of these sensors are utilized for a singular purpose, and are often collecting sensor data that is essentially discarded. For example, while a user is wearing the earbuds, the accelerometer and gyroscope data may still be recorded, but it may only be utilized for determining whether the user has removed the earbuds from the user's ear. Thus, if the user wears the earbuds for an extended period of time (e.g., several hours), the earbuds may be expending energy (and therefore battery life) measuring acceleration and rotation for little benefit. Systems and methods consistent with the present disclosure may enable utilizing such data to track head movement, which may then be used to predict user actions.

"User actions," as used herein, may refer to any of a wide variety of trackable interactions with a user's devices. For example, rewinding playback of a video, skipping a song that is currently playing, placing a telephone call to a contact, and the like are all examples of user actions that can be associated with head movement and predictively suggested and/or executed, consistent with embodiments of the present disclosure.

By way of example, systems and methods consistent with the present disclosure can be described as including three main stages: a learning stage, a prediction stage, and a feedback stage. However, in many instances, one or more of these stages may be performed simultaneously. During the learning stage, various head movements and user actions are detected and associated with one another. Head movements can be detected via, for example, accelerometers, gyroscopes, cameras, and the like. User actions can be detected by the devices being interacted with. In some instances, different interconnected devices may be responsible for different types of data; for example, earbuds may record gyroscope data, while a mobile device (such as a smartphone) may record accelerometer data as well as user interactions with the mobile device.

Other data (i.e., besides head movement and user actions) can also be collected to provide context. For example, contextual data may include location data such as global positioning satellite (GPS) data, events scheduled in a user's calendar, a local time/date, which devices are within range and/or connected to earbuds (or a network to which the earbuds are connected), etc.

As data is collected, it can be stored in a knowledgebase, allowing systems consistent with the present disclosure to detect associations between user actions, head movements, and contextual data. In essence, the associations represent how strong of a predictor a given head movement is for a given user action. For example, a user may perform a first head movement including tilting his/her head in a certain way, and the user may perform a second head movement including nodding twice in quick succession. The knowledgebase may include associations showing that the user frequently performs the first head movement (i.e., head tilt) just before rewinding playback of a video by ten to fifteen seconds, while the second head movement (i.e., nodding twice) may not be strongly associated with any known user action. These associations can be represented/reinforced via machine-learning-based clustering techniques such as, for example, linear regression models, K-nearest neighbor, etc.

Contextual information can help to inform these associations. For example, in some instances, the user may occasionally perform the first head movement without rewinding playback of a video, but all of these instances may occur while the user is not watching a video. Thus, contextual information showing that the user is watching a video may impact the predictive value of a detected head tilt.

The "learning" aspect of the present disclosure may be performed continuously; for example, in some instances, even when the system is predictively executing user actions, new associations may be learned, and other associations may be adjusted as more data becomes available. As an example, a predictive action that is repeatedly undone by a user may be "forgotten." As an additional example, a particularly rare head movement may slowly be associated with a given set of contextual information and user actions over time.

During the "predicting" stage, systems and methods consistent with the present disclosure may detect a head movement that is strongly associated with a given user action (the "predicted action"). The predicted action may, in some instances, be automatically executed. In other instances, the user may be presented with a prompt suggesting or offering to execute the predicted action. For example, continuing with the previous example, upon detecting the user performing the first head movement while a video is playing, systems and methods consistent with the present disclosure may rewind playback of the video by ten to fifteen seconds. Notably, the user may not be required to perform any affirmative actions to rewind the video. Further, the user may not even be aware of what prompted execution of the predicted action (though this information may be made available upon request; a user may be presented with a brief prompt reading, for example, "Video automatically rewound. Tap here to see why/change settings/disable this feature."). In addition, the user may not have even considered performing the predicted action.

The "feedback" stage includes monitoring for user actions (alternatively, "reactions") related to the predicted action, and adjusting associations accordingly. In some instances, the user may perform a first head movement, at which point the system may identify an associated user action and predictively execute the predicted action. For example, the user may tilt his/her head, at which point the system may predict that the user is likely to rewind playback of a video by ten seconds. The system may then rewind the video by ten seconds (sometimes without the user attempting to actually rewind the video). The system may then monitor for further user actions related to the rewinding action. For example, if the user fast forwards the video after the system has rewound it, the system may interpret this to mean that the user did not actually wish to rewind the video (a "negative" result, contradicting the expected association). As an additional example, if the user allows playback to continue as normal, this may be a "neutral" or even "positive" result. Contextual data may also be utilized to aid in characterizing feedback; for example, a camera of the user's mobile device may capture an image of the user's face. If the user frowns in response to execution of the predicted action, this may indicate a negative result. In contrast, if the user smirks, this may indicate a positive result.

As predictive actions are executed (or suggested), additional feedback can be detected. As feedback is received, the associations relied upon for the predictive stage can be adjusted over time. This way, systems and methods consistent with the present disclosure may advantageously enable developing a predictive model to perform various user actions on behalf of the user.

FIG. 1 is a high-level method 100 of user action prediction learning, consistent with several embodiments of the present disclosure. Method 100 comprises collecting data at operation 102. Operation 102 may include, for example, receiving sensor data from one or more accelerometers, gyroscopes, cameras, microphones, etc. This sensor data may be utilized, among other purposes, for tracking head movement of a user. To this end, in some instances, operation 102 may include receiving data from one or more sensors affixed or otherwise operably coupled to a user's head. For example, operation 102 may include receiving accelerometer and/or gyroscope data from earbuds in a user's ears. In such an example, a system performing method 100 may identify whether the earbuds are in the user's ears by communicating with a mobile device connected to the earbuds, as the mobile device may already have access to information regarding whether the earbuds are in the user's ears. In some instances, operation 102 may include receiving accelerometer and/or gyroscope data from sensors in a headset (such as a virtual reality (VR) headset), eyeglasses, etc.

In some instances, operation 102 may include identifying distinct head movements and/or classifying head movements into one of several categories. For example, accelerometer and gyroscope data may be leveraged to identify that a first head movement comprises a user nodding his/her head, while a second head movement comprises a user tilting his/her head. For example, "categories" might include nods, head shakes, tilts, and the like. Categories can be useful for recognizing general moods; a user may nod his/her head in agreement. A "distinct head movement" is a more specific classification than a "category"; for example, a user nodding his/her head in a particular way (e.g., at a rate of around 90 degrees/second, for a duration of longer than 3 seconds, etc.) might be a first distinct head movement, while the user nodding his/her head in a different way (e.g., at a rate of around 40 degrees per second, for a duration of less than 2 seconds) might be a second distinct head movement, even though both distinct head movements may be classified into the "nods" category.

Operation 102 may also include receiving data describing one or more user actions. For example, user actions may include inputs via a user interface, such as button presses, taps, clicks, and the like. This data may be received from one or more devices connected to a network such as, for example, a mobile device (e.g., smartphone, tablet, laptop computer).

Operation 102 may also include receiving contextual data. For example, contextual data may include location data (e.g., Global Positioning System (GPS) data), identity and/or number of devices connected to a network, calendar events, etc. In some instances, data may be utilized as both "head movement" data and "contextual" data. For instance, accelerometer data could be utilized to identify a user's head movement as well as a user's speed. As another example, images from a video camera may be utilized to identify a user's head movement as well as a user's setting (e.g., inside vs. outside, alone vs. with other people, etc.).

As data is collected at operation 102, it is added to a knowledgebase. This way, a system performing method 100 is enabled to learn over time.

Method 100 further comprises analyzing the collected data to identify associations at operation 104. Operation 104 may include clustering user actions, head movements, and contextual data. In essence, operation 104 enables identifying which head movements correspond with which user actions. For example, a user may frequently perform a first head movement (a tilt) shortly before rewinding a video by ten to fifteen seconds. The head tilts and video rewinding actions may be detected via operation 102, and the correlation between the two may be identified at operation 104.

Operation 104 may be performed using various machine learning clustering techniques such as, for example, K-nearest neighbor, linear regression, etc. As the knowledgebase grows over time, more associations can be identified. For example, a user may rarely perform a third head movement comprising the user shaking his/her head in a specific pattern. The first time this third head movement is detected, the user may perform several user actions within the next several seconds, such as turning off his/her car, ending a telephone call, and initiating playback of a certain piece of music. Even if the third head movement might correspond with one of these user actions, the system performing method 100 may be unable to reliably discern which user action the third head movement is associated with based on a single instance. Thus, no associations involving the third head movement may be made at the time. However, over time, the third head movement may be performed more and more, possibly revealing patterns. For example, the second time the third head movement is detected, the user may adjust a smart thermostat and end a telephone call. This may begin to suggest that the third head movement is associated with ending a telephone call, particularly when paired with context data showing that the user is on a telephone call while making the third head movement. However, additional instances may still be required to confidently associate the third head movement with the user action of ending a telephone call.

As the knowledgebase grows over time, existing associations can also be refined. For example, confidence in user actions associated with head movements can be adjusted based on additional instances where the head movement is performed with (or without) performing the associated user action. Further, contextual data can be identified as relevant or irrelevant to an association. For example, a system performing method 100 may identify that a user may frequently perform a fourth head movement shortly before increasing volume of music that is currently playing. In such an example, relevant contextual data may include whether music is currently playing; if music is not playing, then even if the user performs the fourth head movement, the user is unlikely to wish to increase volume of music (because no music is playing). However, over time, additional contextual data may be identified as relevant to the association—for example, after performing the fourth head movement, the user may only increase volume of music if the music being played is by a specific artist or in a certain genre (e.g., classical, pop, etc.). As another example, after performing the fourth head movement, the user may only increase volume of music if the user is utilizing a particular audio device (e.g., the user may increase volume when the user is wearing his/her headset, but not when the music is being played over loudspeakers). Additional contextual information can also be identified (e.g., the user may increase volume when a background noise level is above a particular threshold, such as 50 dB).

Method 100 further comprises detecting a head movement at operation 106. Operation 106 may include, for example, detecting, via accelerometer and/or gyroscope data, that a user has performed a head movement. The head movement may be a specific movement identified via operation 102 (e.g., a nod, a tilt, etc.). In some instances, operation 106 may include detecting a head movement via one or more sensors affixed to a user's head. In some instances, operation 106 may include detecting a head movement via one or more cameras capturing images of the user's head.

Method 100 further comprises predicting a user action at operation 108. Operation 108 may include identifying a user action associated with the head movement detected at operation 106. As an example, operation 106 may include detecting that the user has tilted his/her head, which may be known to a system performing method 100 (as a result of operation 104) to be associated with the user rewinding a video by ten seconds. In such an example, operation 108 may include predicting that the user is likely to rewind a video by ten seconds.

In some instances, the predicted user action may be executed, or the user may be prompted for permission to execute the predicted action, as described in further detail below with respect to FIG. 3. In some instances, rather than (or in addition to) prompting/executing the predicted action, a system performing method 100 may continue to collect data to verify whether the predicted action is correct (i.e., whether the user actually performs the predicted action). In other words, method 100 may return to or continue performing operations 102 and 104. Method 100 may then end at 110.

Figure 2:
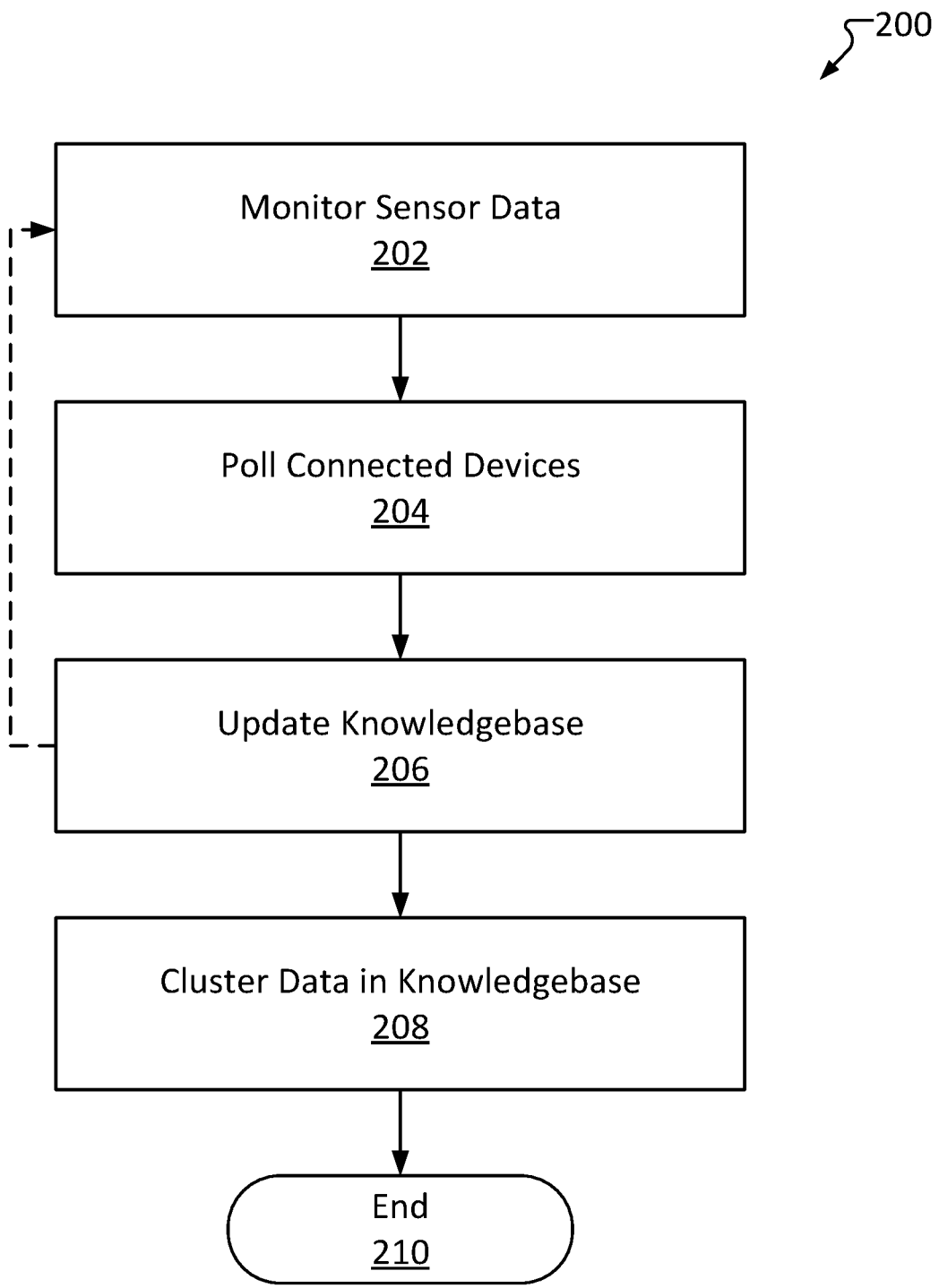
FIG. 2 is a method of developing and maintaining a user action association knowledgebase, consistent with several embodiments of the present disclosure.

FIG. 2 is a method 200 of developing and maintaining a user action association knowledgebase, consistent with several embodiments of the present disclosure.

Method 200 comprises monitoring sensor data at operation 202. Operation 202 may include, for example, receiving data from one or more accelerometers, gyroscopes, cameras, microphones, etc. The sensor data monitored at operation 202 may be analyzed to identify/distinguish between head movements of a user.

Method 200 further comprises polling connected devices at operation 204. Operation 204 may include, for example, identifying devices connected to a system performing method 200 and receiving information from the connected devices describing actions the user has taken. In some instances, operation 204 may include collecting data describing state information of the connected devices (e.g., locked, playing a video, muted, etc.). Operation 204 may enable determining what the user does (user actions) as well as contextual information, such as which device the user is interacting with, location data, etc.

As an example, the system performing method 200 may be a mobile device. Operation 204 may include identifying that the mobile device is connected to a smart automobile (possibly indicating that the user is driving), a laptop computer, a smart thermostat (possibly indicating that the user is home), etc.

Operation 204 may also include receiving data describing user actions that have been performed upon/using the connected devices. For example, a user may decide to watch a video on a smart television. Operation 204 may include sending a message to the smart television and, in return, receiving information indicating that the user has selected a video to watch. In some instances, operation 204 may simply include receiving the information from the smart television; the system performing method 200 may have already established communications with the smart television prior to operation 204 (and so operation 204 need not include sending a message to the smart television). As another example, a user may enter navigation information into an on-board automobile navigation system. Operation 204 may include sending a message to the automobile and, in return, receiving information describing the location that the user has selected. Thus, multiple examples of user actions can be identified. Notably, operation 204 does not necessarily require sensor data from operation 202 in order to detect a user action; the user action may be detected via transmitted messages from connected devices.

Method 200 further comprises updating a knowledgebase at operation 206. Operation 206 may include, for example, adding detected user actions and/or head movements to a knowledgebase along with "surrounding" data, such as contextual data recorded within a temporal range of the detected action/motion. For example, if a user rewinds a video (a user action), operation 206 may include adding an entry describing this action to a knowledgebase, along with all data received at operations 202 and 204 for the ten minutes leading up to the action.

In some instances, operation 202 may include writing sensor data to a cache or buffer, wherein contents of the cache may be written to the knowledgebase at operation 206 in response to a detected user action at operation 204. This may save storage space in the knowledgebase by omitting sensor data that has not been recorded in proximity to a detected user action.

However, sensor data that has not been recorded in proximity to a detected user action may still be useful in the knowledgebase, as it may provide a way to evaluate if the user frequently performs a designated head movement. For example, whenever a user rewinds a video, the user may tilt his/her head in a given manner. The user may not perform this head tilt in connection with any other user action. While this may seem to suggest that the head tilt implies that the user is likely to rewind a video, the user may also frequently perform the head tilt with no user action at all. Thus, the sensor data describing the head tilt may not be a particularly useful indicator of whether the user intends to rewind a video, but this may not be apparent to a system performing method 200 if sensor data outside of user actions is discarded. Thus, in some instances, all data collected via operation 202 may be recorded in the knowledgebase via operation 206 (i.e., regardless of whether a user action has been detected at operation 204).

As an illustrative example, a user may be wearing earbuds while watching a video on a laptop computer. The earbuds and laptop may both be connected to the user's smartphone. The smartphone may be receiving data from the earbud sensors including accelerometer and gyroscope data. While watching the video, the user may tilt his/her head. The smartphone may analyze the accelerometer and gyroscope data from the earbuds to determine that the user has tilted his/her head. The user may also click a "rewind" button on a video player on the laptop. The laptop, being connected to the smartphone, may send data to the smartphone indicating that the user has clicked the rewind button. The smartphone may therefore add the data describing the user clicking the "rewind" button to the knowledgebase. In adding this data, the smartphone may also add the accelerometer and gyroscope data recorded over the last ten minutes to the knowledgebase. In some instances, the smartphone may designate time ranges of accelerometer and gyroscope data that constitute the detected head tilt. In some instances, the smartphone may also add data recorded after the user action as well. In some instances, the smartphone may add all recorded data to the knowledgebase.

In some instances, the storage of the knowledgebase and/or the analysis of the head movement data may take place on a different device, such as a cloud server. For example, a user's smartphone may receive the accelerometer and gyroscope data and transmit it to a cloud server, where the cloud server may analyze the data for possible indicators of head movements.

Method 200 further comprises clustering data in the knowledgebase at operation 208. Operation 208 may allow a system performing method 200 to identify specific head movements that are strongly correlated with specific user actions (and/or contextual data). Operation 208 may include, for example, applying one or more clustering techniques such as K-nearest neighbor, linear regression, etc., to the knowledgebase to identify trends.

In some instances, a system performing method 200 may continuously monitor sensor data and poll connected devices, repeatedly adding this information to the knowledgebase. In other words, operations 202, 204, and 206 may be performed in a loop, indicated by a dashed line in FIG. 2. Operation 208 may be performed periodically, such as once/day. In some instances, operation 208 may be performed once the knowledgebase has reached a designated size. Method 200 then ends at 210.

Figure 3:
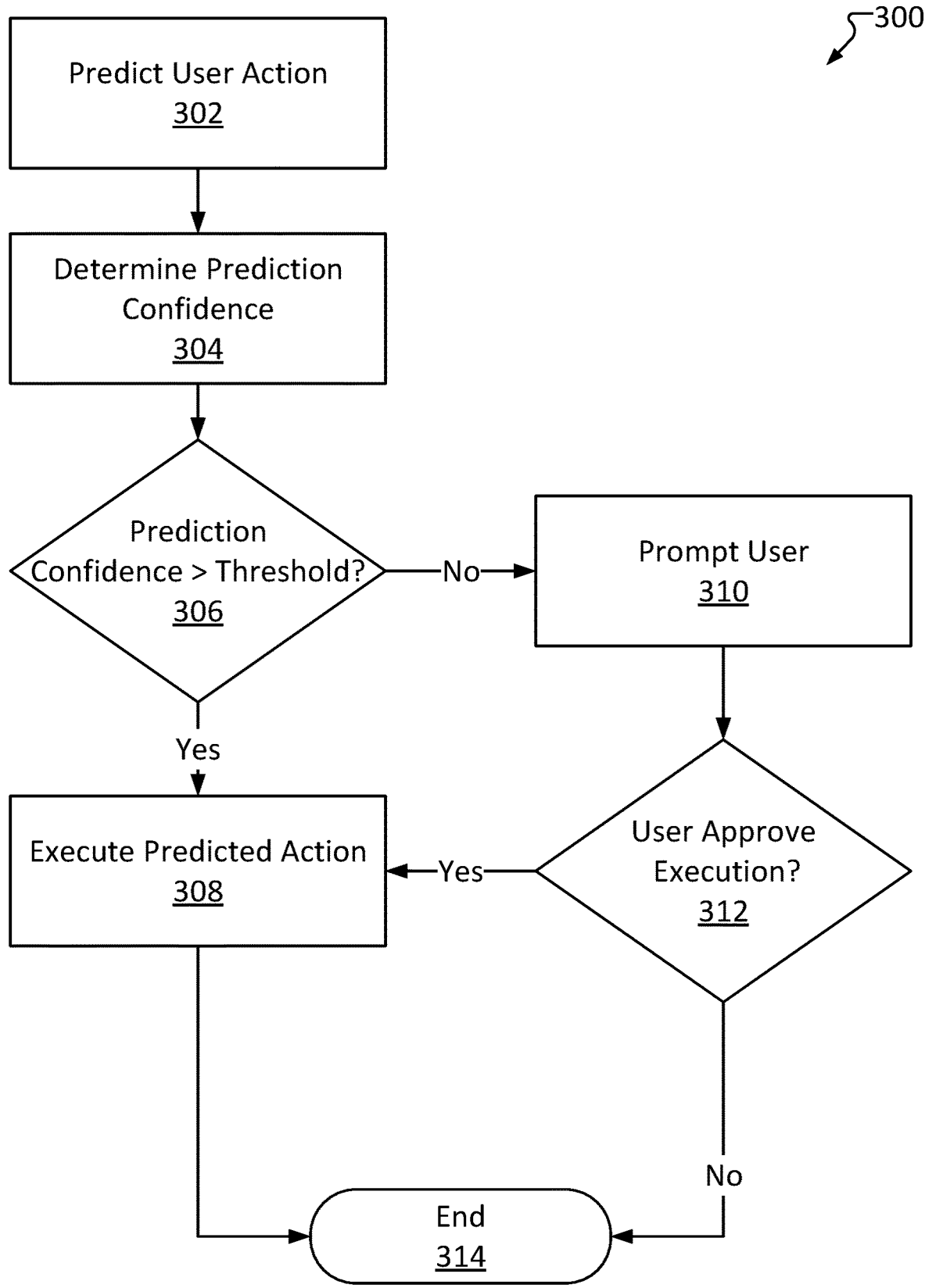
FIG. 3 is a method of deciding whether to execute a predicted user action execution, consistent with several embodiments of the present disclosure.

FIG. 3 is a method 300 of deciding whether to execute a predicted user action execution, consistent with several embodiments of the present disclosure. Method 300 may be performed by a system having learned user action associations (such as, for example, via method 100 and/or 200).

Method 300 comprises predicting a user action at operation 302. Operation 302 may include, for example, predicting that a user intends to perform a particular action, or is likely to perform the action regardless of intent. As an example, operation 302 may include detecting that a user has performed a specific head tilt (e.g., tilted his/her head to the left by 45 degrees), checking a knowledgebase and determining, based on the checking, that the specific head tilt is strongly associated with the user rewinding a video by ten seconds.

The action may be predicted based on one or more detected head movements of a user. In some instances, the prediction may be based further on contextual data, such as a time of day, a location of the user, etc. In some instances, operation 302 may be performed in a manner substantially similar to operation 108 of method 100.

Method 300 further comprises determining a prediction confidence at operation 304. Operation 304 may include, for example, evaluating a strength of an association between a detected head movement and the action predicted at operation 302. Operation 304 may be enabled by one or more clustering techniques applied to the knowledgebase, such as those described above with reference to operation 208. As a simplified example, if the detected head movement has been detected ten times in the past, and in nine of those ten instances, the user has rewound a video by ten seconds, then the confidence may be 90% (i.e., 9/10). Contextual data can provide additional factors to consider in evaluating prediction confidence. For example, the user may have been watching a video in all nine instances in which the head movement was following by a rewinding action, while the user may not have been watching a video during the tenth instance. With this context, if the user is watching a video when the head tilt is detected, the confidence in the prediction may be substantially higher.

In some instances, multiple different confidences may be evaluated. For example, a first confidence may represent a confidence that a user actually performed a specific head movement (a "movement confidence"), while a second confidence may represent a confidence that the specified head movement actually corresponds to the predicted action (an "association confidence"). As an illustrative example, a system can determine a 95% confidence that a user tilted his/her head to the left by 45 degrees, and a 90% confidence that such a head tilt indicates that the user is about to rewind a video by ten seconds.

Method 300 further comprises comparing the prediction confidence to a threshold at operation 306. The threshold may be predetermined or set by a user. In some instances, multiple thresholds may be provided, and may be selected based on several factors. The threshold may depend upon the nature of the predicted action. For example, a first threshold of 75% may be utilized for a predicted action of rewinding a video, while a second threshold of 98% may be utilized for a predicted action of adjusting a thermostat.

In some instances, operation 306 may include multiple threshold comparisons using multiple confidence values and thresholds. For example, a first threshold may be utilized for a movement confidence (e.g., 95%), while a second threshold may be utilized for an association confidence (e.g., 90%). In some instances, multiple thresholds and confidences may be concatenated (e.g., via an average, a weighted sum, etc.) into a single representative prediction confidence and confidence threshold.

If the prediction confidence is above the threshold (306 "Yes"), method 300 further comprises executing the predicted action at operation 308. For example, operation 308 may include sending a signal to a connected laptop computer to rewind playback of a video by ten seconds. As an additional example, operation 308 may include sending a signal to a smart thermostat to adjust a temperature. Other connected devices can also be controlled. As noted, in some instances, multiple confidences may be compared to corresponding thresholds before the action is executed.

In some instances, some predicted actions may be considered too "sensitive" and may therefore never be automatically executed. For example, in some instances, a system performing method 300 may not transfer funds based on a detected head movement without at least first prompting the user, regardless of confidence in the user's intent or likelihood. This may prevent inadvertent transfers, such as a duplicate transfer (e.g., the user may transfer the funds his/herself before realizing they were already transferred automatically). The types of actions that are eligible/ineligible for automatic execution may be set by a user.

If the prediction confidence is not above the threshold (306 "No"), method 300 further comprises prompting the user regarding execution of the predicted action at operation 310. Operation 310 may include, for example, generating a popup window on a screen of a user device, pushing a notification to a user's smartphone, sending a message via standard messaging service (SMS, i.e., a text message), an email, etc. The prompt may include a description of the predicted action as well as an option to approve or deny execution of the predicted action. In some instances, the prompt may also include a timer at which point the predicted action will be declined (e.g., not automatically executed), though in other instances, upon such a "timeout" the action may be executed instead. Method 300 further comprises determining whether the user has approved execution of the predicted action at operation 312. If the user has approved execution (312 "Yes"), method 300 proceeds to executing the predicted action at operation 308, as described above.

After executing the prediction action at operation 308 (either after a prediction confidence exceeding the threshold at block 306 or user approval at block 312), method 300 may then end at 314. If the user has not approved execution (312 "No"), method 300 may end at 314 (i.e., without executing the predicted action via operation 308).

Figure 4:
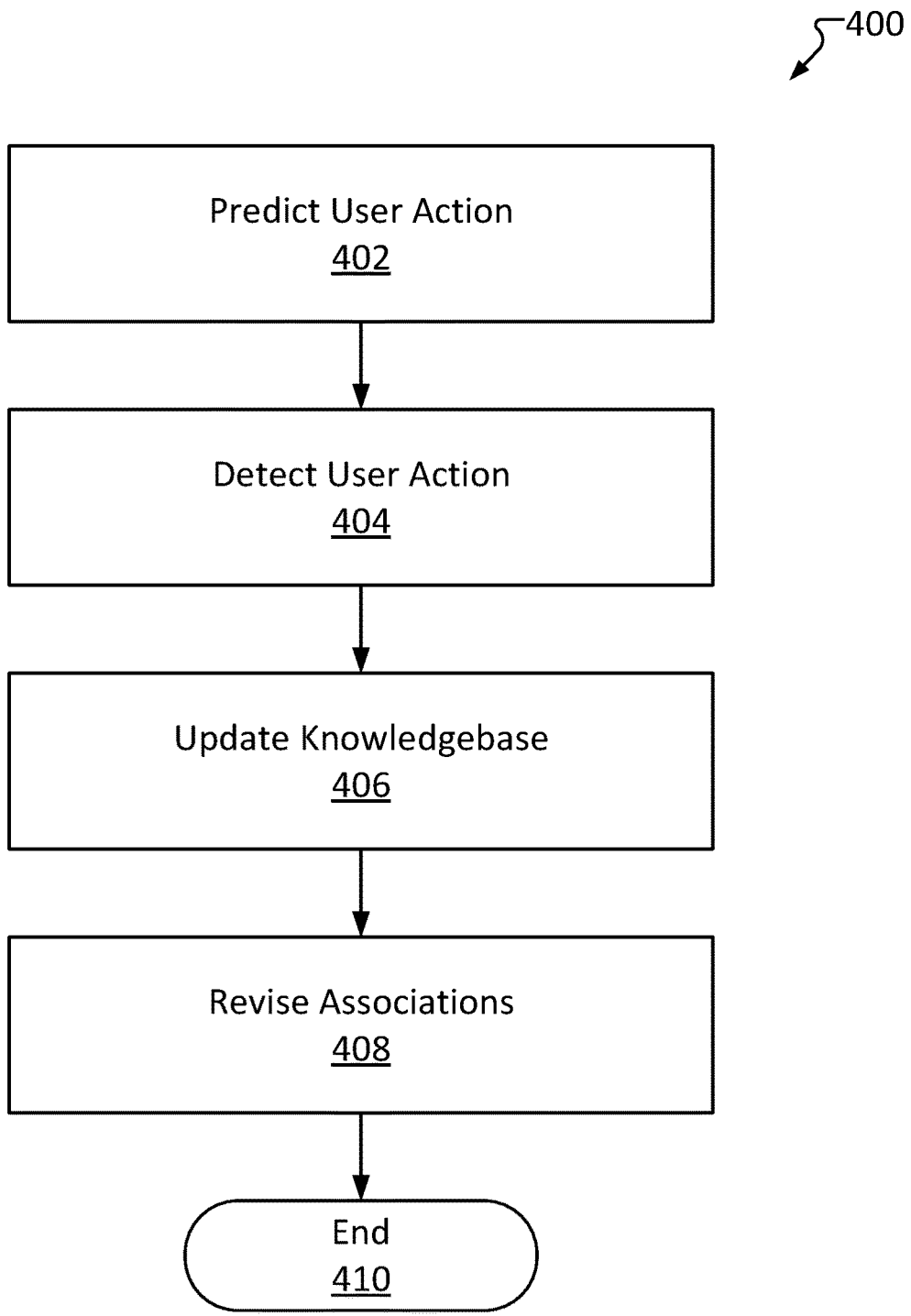
FIG. 4 is a method for updating associations based on user action feedback, consistent with several embodiments of the present disclosure.

FIG. 4 is a method 400 for updating associations based on user action feedback, consistent with several embodiments of the present disclosure. Method 400 may be useful to further train a system consistent with the present disclosure; even though method 400 may not necessarily include executing a predicted action, the action is predicted and then compared to what the user actually does (if anything). This way, the system can further populate a knowledgebase and revise associations based on further data.

Method 400 comprises predicting a user action at operation 402. Operation 402 may include, for example, detecting a head movement of a user (via sensor data) and identifying a user action associated with the head movement, similar to operation 108 of method 100.

Method 400 further comprises detecting a user action at operation 404. Operation 404 may include, for example, polling devices connected to a network including a system performing method 400. Operation 404 may be performed in a manner substantially similar to operation 104 of method 100. For example, operation 404 may include receiving data from devices and/or applications indicating that the user has performed a particular action (such as rewinding a video, changing a thermostat setting, etc.).

Method 400 further comprises updating a knowledgebase at operation 406. Operation 406 may include, for example, adding the detected action to the knowledgebase, along with contextual data and head movement data. In some instances, entries in the knowledgebase may be classified according to detected action, detected head movement, etc. This may enable fast lookup for future reference.

Method 400 further comprises revising associations at operation 408. Operation 408 may include comparing the predicted action of operation 402 to the detected action of operation 404. This may function as a feedback loop, enabling a system performing method 400 to learn to predict actions with greater accuracy over time. Method 400 may then end at 410.

In some instances, method 400 may be performed concurrently with, or as a part of, method 300. For example, a head movement may be detected and an associated user action predicted. However, the user may perform a different user action (for example, the user may ignore a prompt from operation 310). This may indicate that the prediction was incorrect.

In some instances, the detected user action may directly contradict the predicted action. For example, a system consistent with the present disclosure may detect a specific head movement, and as a result, may predict and automatically execute the action of rewinding a video by ten seconds (e.g., from a fifteen second mark to a five second mark). The system may then detect that the user fast forwarded the video back to the original time (e.g., back to the fifteen second mark). This may indicate that the user did not wish or intend to rewind the video. Thus, an association between the detected head movement and the action of rewinding a video by ten seconds was incorrect (or at least overrepresented). Via method 400, a system can revise such an association to reflect this, enabling the system to become more intelligent and accurate over time.

Figure 5:
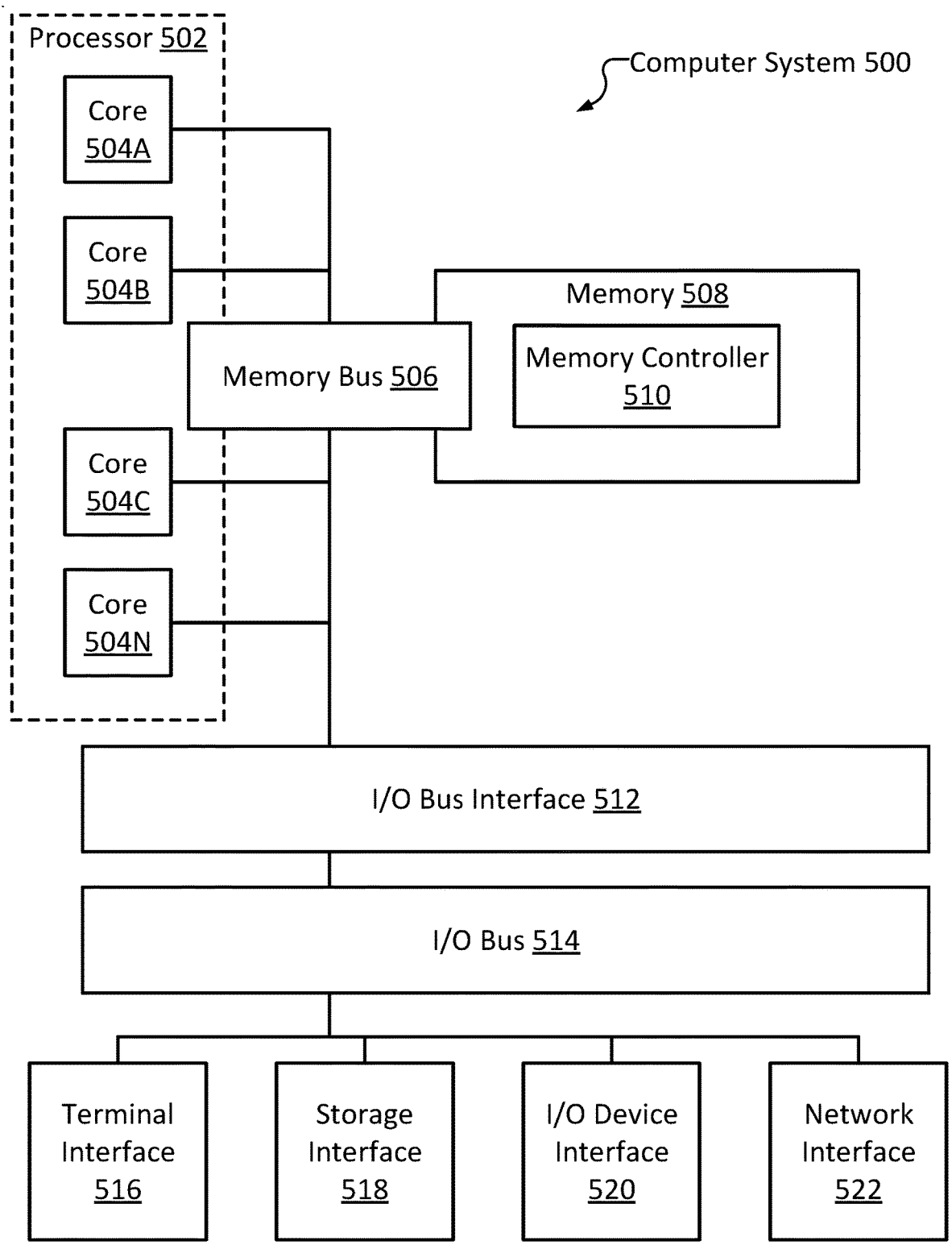
FIG. 5 illustrates a high-level block diagram of an example computer system that may be used in implementing embodiments of the present disclosure.

Referring now to FIG. 5, shown is a high-level block diagram of an example computer system 500 that may be configured to perform various aspects of the present disclosure, including, for example, methods 100, 200, 300, and 400. The example computer system 500 may be used in implementing one or more of the methods or modules, and any related functions or operations, described herein (e.g., using one or more processor circuits or computer processors of the computer), in accordance with embodiments of the present disclosure. In some embodiments, the major components of the computer system 500 may comprise one or more CPUs 502, a memory subsystem 508, a terminal interface 516, a storage interface 518, an I/O (Input/Output) device interface 520, and a network interface 522, all of which may be communicatively coupled, directly or indirectly, for inter-component communication via a memory bus 506, an I/O bus 514, and an I/O bus interface unit 512.

The computer system 500 may contain one or more general-purpose programmable processors 502 (such as central processing units (CPUs)), some or all of which may include one or more cores 504A, 504B, 504C, and 504N, herein generically referred to as the CPU 502. In some embodiments, the computer system 500 may contain multiple processors typical of a relatively large system; however, in other embodiments the computer system 500 may alternatively be a single CPU system. Each CPU 502 may execute instructions stored in the memory subsystem 508 on a CPU core 504 and may comprise one or more levels of on-board cache.

In some embodiments, the memory subsystem 508 may comprise a random-access semiconductor memory, storage device, or storage medium (either volatile or non-volatile) for storing data and programs. In some embodiments, the memory subsystem 508 may represent the entire virtual memory of the computer system 500 and may also include the virtual memory of other computer systems coupled to the computer system 500 or connected via a network. The memory subsystem 508 may be conceptually a single monolithic entity, but, in some embodiments, the memory subsystem 508 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 508 may contain elements for control and flow of memory used by the CPU 502. This may include a memory controller 510.

Although the memory bus 506 is shown in FIG. 5 as a single bus structure providing a direct communication path among the CPU 502, the memory subsystem 508, and the I/O bus interface 512, the memory bus 506 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 512 and the I/O bus 514 are shown as single respective units, the computer system 500 may, in some embodiments, contain multiple I/O bus interface units 512, multiple I/O buses 514, or both. Further, while multiple I/O interface units are shown, which separate the I/O bus 514 from various communications paths running to the various I/O devices, in other embodiments some or all of the I/O devices may be connected directly to one or more system I/O buses.

In some embodiments, the computer system 500 may be a multi-user mainframe computer system, a single-user system, or a server computer or similar device that has little or no direct user interface but receives requests from other computer systems (clients). Further, in some embodiments, the computer system 500 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 500. In some embodiments, however, individual components may have greater or lesser complexity than as represented in FIG. 5, components other than or in addition to those shown in FIG. 5 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   receiving sensor data from a first sensor, the first sensor affixed to a head of a user;
   detecting, based on the sensor data, a first head movement performed by the user;
   comparing the first head movement with a knowledge-base;
   predicting, based on the comparing, an action by the user;
   executing the predicted action;
   detecting, based on the sensor data, a second head movement performed by the user;
   determining from the second head movement that the user did not wish to perform a second predicted action; and applying a negative feedback result to the second predicted action in the knowledgebase.

2. The method of claim 1, further comprising:
identifying a user reaction to the executing; and
updating the knowledgebase based on the user reaction.

3. The method of claim 1, further comprising:
providing a prompt of the predicted action to the user; and
receiving a response to the prompt, wherein:
the response approves execution of the predicted action; and
the execution is based on the response.

4. The method of claim 1, wherein:
the first sensor is included in a device; and
the device is affixed to an ear of the user.

5. The method of claim 1, further comprising:
receiving feedback from a user; and
updating the knowledgebase based on the feedback.

6. The method of claim 5, further comprising transmitting a notification to the user, wherein the feedback is received in response to the notification.

7. The method of claim 1, further comprising identifying associations between detected head movements and user actions, wherein the predicting is based further on the associations.

8. A system, comprising:
a memory; and
a central processing unit (CPU) coupled to the memory, the CPU configured to:
receive sensor data from a first sensor, the first sensor affixed to a head of a user;
detect, based on the sensor data, a first head movement performed by the user;
compare the first head movement with a knowledgebase;
predict, based on the comparing, an action by the user;
execute the predicted action;
detect, based on the sensor data, a second head movement performed by the user;
determine from the second head movement that the user did not wish to perform a second predicted action; and
apply a negative feedback result to the second predicted action in the knowledgebase.

9. The system of claim 8, wherein the CPU is further configured to:
identify a user reaction to the executing; and
update the knowledgebase based on the user reaction.

10. The system of claim 8, wherein the CPU is further configured to:
provide a prompt of the predicted action to the user; and
receive a response to the prompt, wherein:
the response approves execution of the predicted action; and
the execution is based on the response.

11. The system of claim 8, wherein:
the first sensor is included in a device; and
the device is affixed to an ear of the user.

12. The system of claim 8, wherein the CPU is further configured to:
receive feedback from a user; and
update the knowledgebase based on the feedback.

13. The system of claim 12, wherein the CPU is further configured to transmit a notification to the user, wherein the feedback is received in response to the notification.

14. The system of claim 8, wherein the CPU is further configured to identify associations between detected head movements and user actions, wherein the predicting is based further on the associations.

15. A computer program product, the computer program product comprising a computer readable storage medium having program instructions embodied therewith, the program instructions executable by a computer to cause the computer to:
receive sensor data from a first sensor, the first sensor affixed to a head of a user;
detect, based on the sensor data, a first head movement performed by the user;
compare the first head movement with a knowledgebase;
predict, based on the comparing, an action by the user;
execute the predicted action;
detect, based on the sensor data, a second head movement performed by the user;
determine from the second head movement that the user did not wish to perform a second predicted action; and
apply a negative feedback result to the second predicted action in the knowledgebase.

16. The computer program product of claim 15, wherein the instructions further cause the computer to:
provide a prompt of the predicted action to the user; and
receive a response to the prompt, wherein:
the response approves execution of the predicted action; and
the execution is based on the response.

17. The computer program product of claim 15, wherein the instructions further cause the computer to:
receive feedback from a user; and
update the knowledgebase based on the feedback.

18. The computer program product of claim 17, wherein the instructions further cause the computer to transmit a notification to the user, wherein the feedback is received in response to the notification.

19. The computer program product of claim 15, wherein the instructions further cause the computer to identify associations between detected head movements and user actions, wherein the predicting is based further on the associations.

20. The computer program product of claim 15, wherein the instructions further cause the computer to:
represent and reinforce an association between the received sensor data and the detected first head movement information in the knowledgebase based on a clustering technique selected from the group consisting of a linear regression model and a K-nearest neighbor model.

* * * * *